(12) United States Patent
Osselaere et al.

(10) Patent No.: US 7,979,187 B2
(45) Date of Patent: Jul. 12, 2011

(54) METHOD FOR ENGAGING A CLUTCH

(75) Inventors: Guy H. J. Osselaere, Zedelgem (BE); Karel C. F. Pauwels, Izegem (BE)

(73) Assignee: CNH America LLC, New Holland, PA (US)

( * ) Notice: Subject to any disclaimer, the term of this patent is extended or adjusted under 35 U.S.C. 154(b) by 812 days.

(21) Appl. No.: 12/070,883

(22) Filed: Feb. 21, 2008

(65) Prior Publication Data

US 2008/0228364 A1    Sep. 18, 2008

(30) Foreign Application Priority Data

Mar. 16, 2007   (GB) .................................. 0705086.7

(51) Int. Cl.
| F16D 13/75 | (2006.01) |
|---|---|
| F16D 48/06 | (2006.01) |
| F16D 43/20 | (2006.01) |
| A01D 69/08 | (2006.01) |

(52) U.S. Cl. ........... 701/68; 701/50; 172/533; 192/52.4; 192/55.1; 56/11.7

(58) Field of Classification Search ............... 701/50, 701/67–68; 192/52.4, 55.1; 172/533; 56/11.7
See application file for complete search history.

(56) References Cited

U.S. PATENT DOCUMENTS

| 3,809,201 | A | * | 5/1974 | Miyanishi et al. | ......... 192/109 F |
|---|---|---|---|---|---|
| 3,848,620 | A | * | 11/1974 | Fisher et al. | ............. 137/116.3 |
| 4,086,994 | A | * | 5/1978 | Hirosawa et al. | .......... 192/109 F |
| 4,216,852 | A | * | 8/1980 | Ushijima | ................... 192/85.42 |
| 4,248,330 | A | * | 2/1981 | Audiffred et al. | ............. 192/219 |
| 4,261,450 | A | * | 4/1981 | Matsushima et al. | ........ 192/12 C |
| 4,289,221 | A | * | 9/1981 | Chambers et al. | ........... 192/3.57 |
| 4,481,843 | A | * | 11/1984 | Jarvis et al. | .................... 477/162 |
| 4,532,827 | A | * | 8/1985 | Beim | .............................. 74/745 |
| 4,653,350 | A | * | 3/1987 | Downs et al. | ................... 701/58 |
| 4,653,351 | A | * | 3/1987 | Downs et al. | ................. 477/148 |
| 4,724,723 | A | * | 2/1988 | Lockhart et al. | .............. 477/102 |
| 4,848,530 | A | * | 7/1989 | Chess | ......................... 192/3.58 |
| 4,943,920 | A | * | 7/1990 | Hiramatsu et al. | ............. 701/51 |
| 5,046,383 | A | * | 9/1991 | Butts et al. | ..................... 477/120 |
| 5,050,458 | A | * | 9/1991 | Vukovich et al. | ............. 477/154 |
| 5,151,858 | A | * | 9/1992 | Milunas et al. | ................. 701/48 |
| 5,251,132 | A | * | 10/1993 | Bulgrien | ......................... 701/67 |

(Continued)

FOREIGN PATENT DOCUMENTS

FR           2797481           2/2001

(Continued)

*Primary Examiner* — Mark Hellner
*Assistant Examiner* — Ari M Diacou
(74) *Attorney, Agent, or Firm* — Michael G. Harms; Patrick M. Sheldrake

(57) ABSTRACT

A method for coupling a load to a power source by means of a clutch, the method having the steps of initially increasing the pressure of the actuator to bring the pressure plates of the clutch into contact with the clutch plates gradually increasing the pressure of the actuator even further to allow the clutch plates to be engaged with the pressure plates while decreasing at least ones the pressure during a short time to create pressure dips such that the torque generated over the load is at least temporarily decreased, and levelling the pressure of the actuator to maintain the engagement of the pressure plates with the clutch plates to allow the load to be driven by the power source.

8 Claims, 3 Drawing Sheets

U.S. PATENT DOCUMENTS

| | | | | |
|---|---|---|---|---|
| 5,282,401 A | * | 2/1994 | Hebbale et al. | 475/123 |
| 5,307,269 A | * | 4/1994 | Kohno | 701/68 |
| 5,409,421 A | * | 4/1995 | Sakai et al. | 474/28 |
| 5,454,767 A | * | 10/1995 | Clausen et al. | 477/32 |
| 5,588,327 A | * | 12/1996 | Downs et al. | 74/335 |
| 5,743,366 A | * | 4/1998 | Stoever et al. | 192/12 C |
| 5,778,329 A | * | 7/1998 | Officer et al. | 701/55 |
| 6,176,811 B1 | * | 1/2001 | Popp et al. | 477/115 |
| 6,247,295 B1 | * | 6/2001 | Hansen et al. | 56/10.2 A |
| 6,247,487 B1 | * | 6/2001 | Skill | 137/198 |
| 6,285,942 B1 | * | 9/2001 | Steinmetz et al. | 701/67 |
| 6,450,309 B1 | * | 9/2002 | Hirai et al. | 192/3.63 |
| 6,554,742 B2 | * | 4/2003 | Milender et al. | 477/155 |
| 6,595,898 B2 | * | 7/2003 | Kobayashi et al. | 477/174 |
| 6,616,560 B2 | * | 9/2003 | Hayabuchi et al. | 475/116 |
| 6,626,036 B2 | * | 9/2003 | Milender et al. | 73/168 |
| 6,656,087 B1 | * | 12/2003 | Runde et al. | 477/107 |
| 2002/0019295 A1 | * | 2/2002 | Kobayashi et al. | 477/174 |
| 2002/0079002 A1 | * | 6/2002 | Ueki | 137/625.3 |
| 2003/0022757 A1 | * | 1/2003 | Shimabukuro et al. | 477/115 |
| 2003/0134712 A1 | * | 7/2003 | Katou et al. | 477/70 |
| 2004/0242358 A1 | * | 12/2004 | Tanikawa | 475/114 |
| 2005/0217398 A1 | | 10/2005 | Hou et al. | |
| 2005/0222737 A1 | * | 10/2005 | Imamura et al. | 701/67 |
| 2005/0222738 A1 | * | 10/2005 | Imamura et al. | 701/67 |
| 2006/0240941 A1 | * | 10/2006 | Martin | 477/34 |
| 2009/0125201 A1 | * | 5/2009 | Leibbrandt et al. | 701/67 |
| 2010/0057318 A1 | * | 3/2010 | Nedachi et al. | 701/68 |

FOREIGN PATENT DOCUMENTS

| | | |
|---|---|---|
| GB | 2356438 | 5/2001 |
| JP | 63280929 | 11/1988 |

* cited by examiner

METHOD FOR ENGAGING A CLUTCH

CROSS REFERENCE TO RELATED APPLICATIONS

This Patent Application claims priority under 35 U.S.C. §119 to GB 0705086.7, filed on Mar. 16, 2007 titled, "Method for Engaging a Clutch" and having Guy N. J. Osselaere and Karel C. F. Pauwels as inventors. The full disclosure of GB 0705086.7 is hereby fully incorporated herein by reference.

FIELD OF THE INVENTION

The present invention relates generally to systems for transmission of mechanical power. It relates more particularly to a method for improving the coupling of a clutch on an agricultural machine.

BACKGROUND OF THE INVENTION

Clutches are widely used to couple driven rotary shafts to driving rotary shafts, i.e. to couple a load to a source of power. Because in most instances a driven shaft is initially at a standstill and a driving shaft is rotating when coupling, slippage occurs between engaging surfaces of the driven and driving members of the clutch while friction between these surfaces accelerates the driven shaft to the speed of the driving shaft during engagement of the clutch. This relative motion of slippage in the presence of friction generates heat.

A disc clutch is one type of clutch often provided in agricultural machinery. Such a disc clutch includes at least one generally disc-shaped driving member or pressure plate and at least one generally disc-shaped driven member or clutch plate. A spring is foreseen to keep the plates a distance from each other to prevent unwanted coupling. An actuator located within or upon the clutch forces the pressure plate against the clutch plate when clutch engagement is desired.

When a signal is given to the actuator to engage the clutch, the actuator has to overcome the pressure of the spring before the pressure plate actually starts to move towards the clutch plate. Once the force of the actuator is above the tension of the spring, the pressure plate will move towards the clutch plate until they make contact. The force by the actuator will then be increased, such that the plates will start to couple. When the angular speeds of the driven and driving members of the clutch are equal, engagement of the clutch is complete and the pressure of the actuator will be leveled such that the engagement between the plates is maintained.

However, when engaging the plates, the driven shaft generates a torque while speeding up the load. If this torque on the load is above the structural limitations of the load, the load itself might be damaged.

OBJECT OF THE INVENTION

The present invention seeks to mitigate the problems resulting from the increase of torque on the clutch and on the load.

SUMMARY OF THE INVENTION

According to the present invention, there is provided a method for coupling a load to a power source by means of a clutch, the clutch comprises at least one pressure plate connected to the power source, at least one clutch plate connected to the load and located near the at least one pressure plate to allow contact with the at least one pressure plate, an actuator connected with the at least one pressure plate and capable of forcing the at least one pressure plate against the at least one clutch plate, the method comprises the steps of:

initially increasing the pressure of the actuator to bring the at least one pressure plate into contact with the at least one clutch plate, gradually increasing the pressure of the actuator even further to allow the at least one clutch plate to be engaged with the at least one pressure plate, and levelling the pressure of the actuator to maintain the engagement of the at least one pressure plate with the at least one clutch plate to allow the load to be driven by the power source, characterised in that the gradually increasing step consists of gradually increasing the pressure of the actuator while decreasing at least ones the pressure during a short time to create pressure dips such that the torque generated over the load is at least temporarily decreased.

BRIEF DESCRIPTION OF THE DRAWINGS

The invention will now be described in further detail, by way of example, with reference to the accompanying drawings, in which.

DETAILED DESCRIPTION OF THE PREFERRED EMBODIMENT(S)

Figure 1:
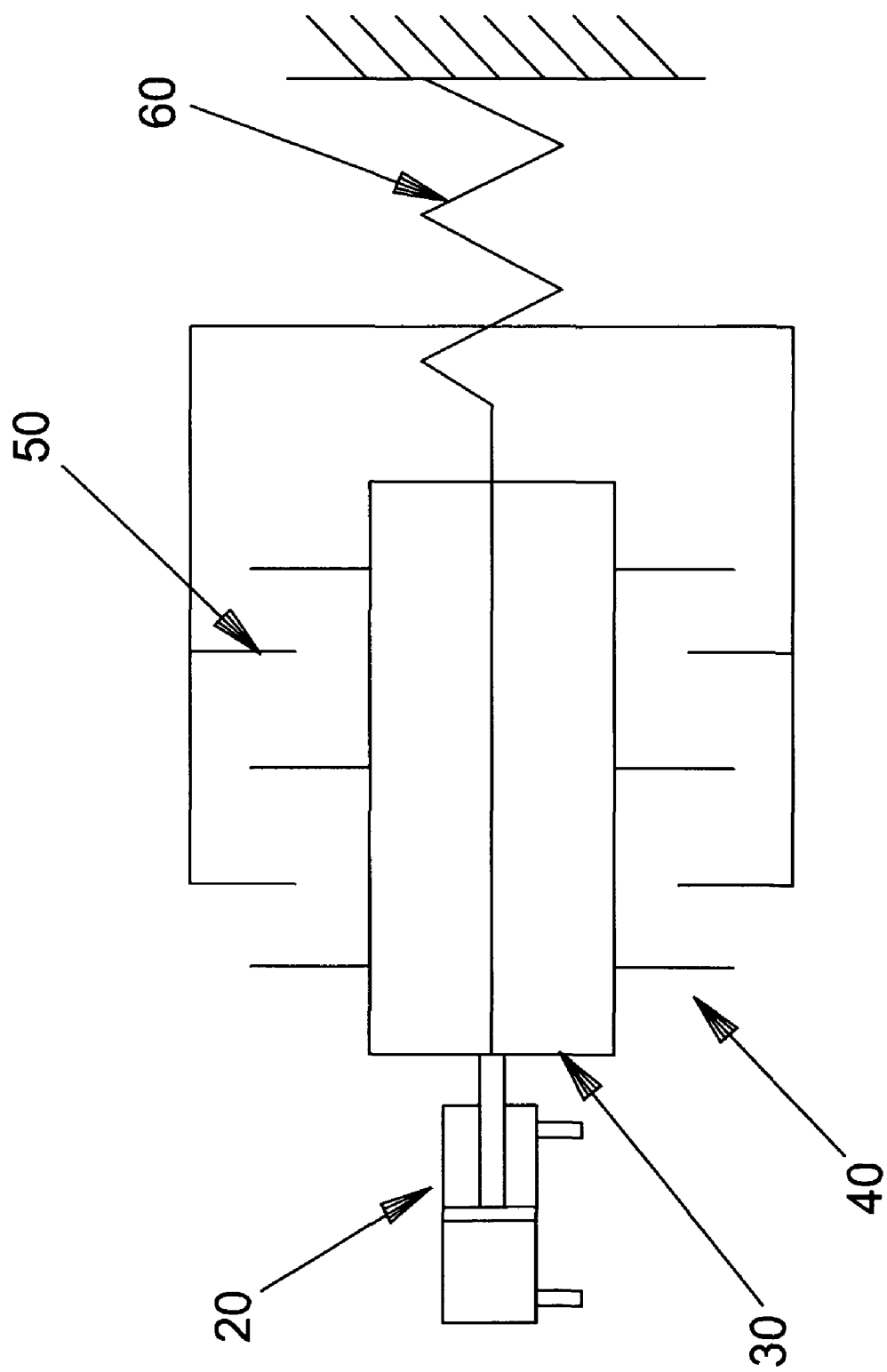
FIG. 1 is a schematic view of a clutch of a type known in the art.

FIG. 1 shows a clutch assembly having a clutch housing 30 connected to a driving rotary shaft (not shown). Pressure plates 40 are connected to the clutch housing 30. An actuator 20 is able to move the clutch assembly towards the clutch plates 50 against the pressure of the spring 60. The clutch plates 50 are connected to the driven rotary shafts to drive a load (not shown).

Figure 2:
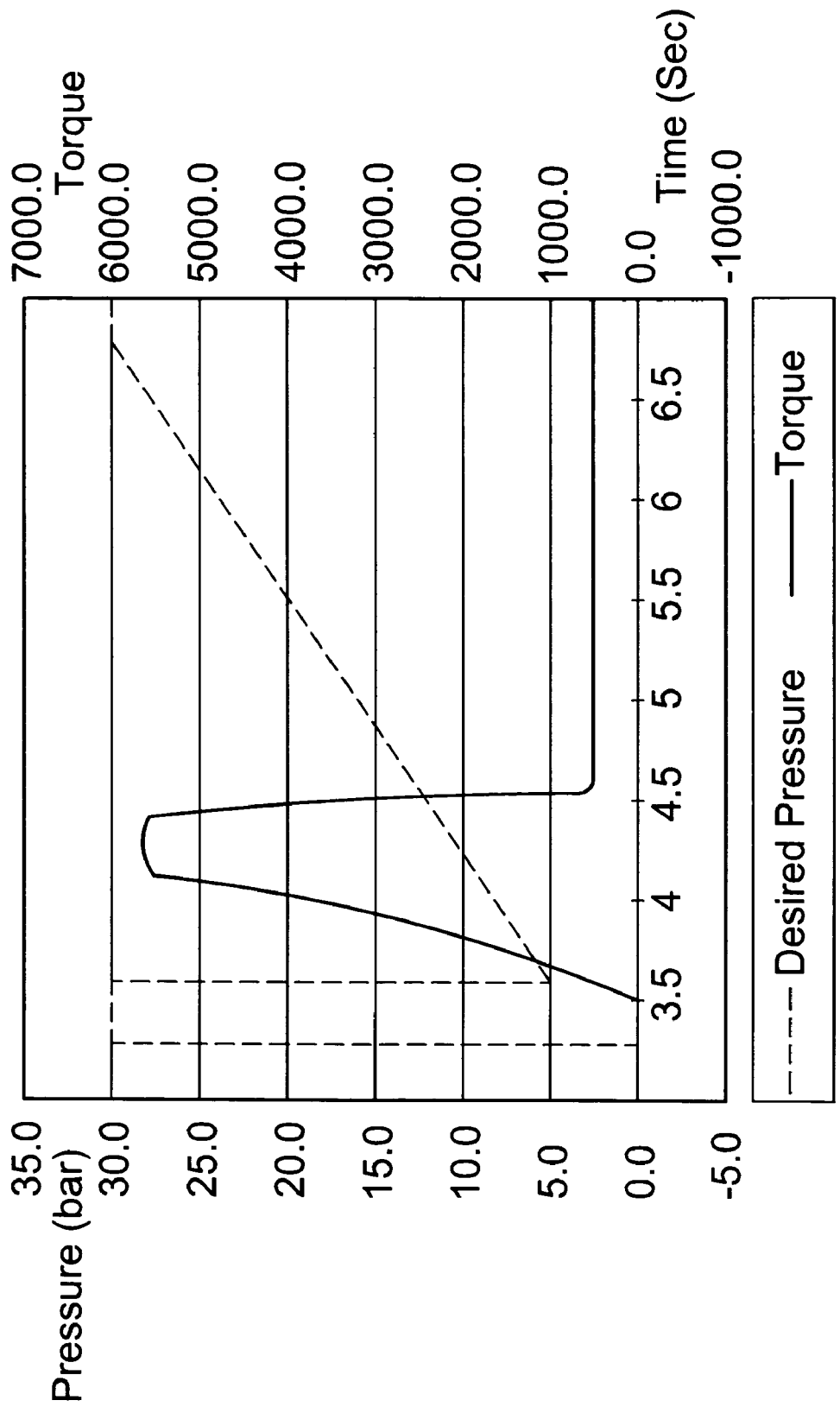
FIG. 2 is a graphical representation of the normal pressure characteristic applied by the actuator on the pressure plates and the torque generated on a load.

As can be seen from FIG. 2, the application of pressure by the actuator 20 on the pressure plates 40 can be divided into three regions: the first region being a region where the pressure of the actuator is rapidly increased. This is due to the fact that there is a small gap between the pressure plates 40 and the clutch plates 50. A short injection of pressure fluid is used to move the pressure plates 40 against the clutch plates 50. A second region is where the plates are starting to make contact, but the pressure plates 40 are still rotating at a higher speed than the clutch plates 50. By increasing the pressure of the pressure plates 40 against the clutch plates 50, the clutch plates 50 will start to rotate with the pressure plates 40. Finally, when the plates 40, 50 are fully engaged and rotating at the same speed, the engagement is complete and the pressure of the actuator is held constant to allow the plates to remain in contact such that full power is transferred from the power source (not shown) to the load (also not shown).

FIG. 2 shows the increase in torque on the load occurring in the second region. When increasing the pressure applied by the pressure plates on the clutch plates, an increasing torque is transferred upon the load. It is important that this torque increase is below the structural limitations of the load.

Figure 3:
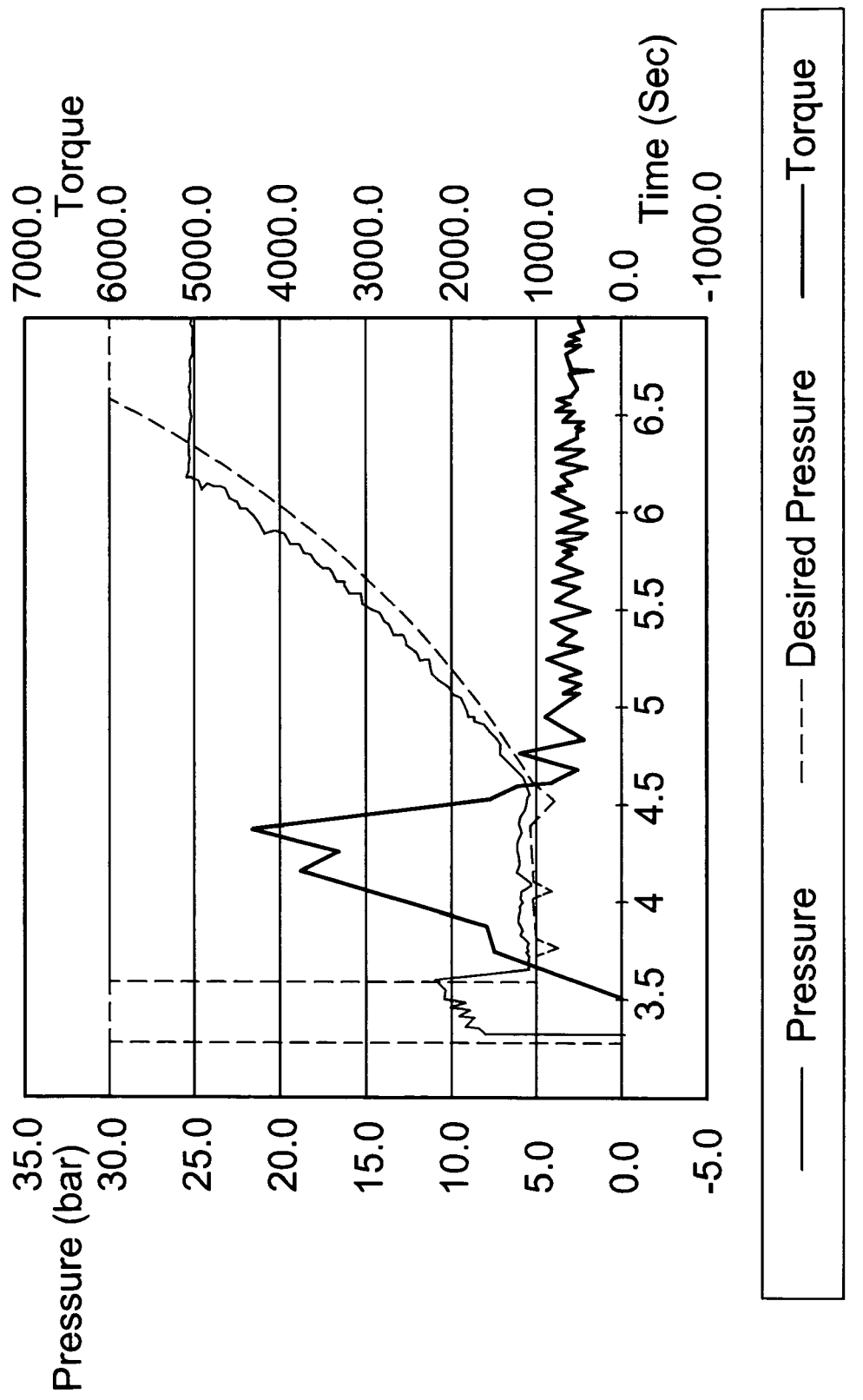
FIG. 3 is a graphical representation of the desired and the actual pressure characteristic applied by the actuator and the torque on the load when applying the method according to the invention.

This limitation in the torque is accomplished by the inventive method shown in FIG. 3.

As explained above, a certain time interval is present between the actual coupling command and the moment the pressure plates and clutch plates make contact and start to engage. This is due to the distance between the two plates and the force needed to overcome the force of the spring which keeps the plates a small distance from each other. This spring force needs to be overcome before the two plates start to move towards each other. It is important to keep this time interval as short as possible, since it will slow down the overall engagement time of the driving rotary shaft with the driven rotary shaft.

Therefore, when a signal is given that the load should be engaged with the power source, full pressure is given to the actuator for a certain time interval. When the actuator receives this full pressure signal, the actuator will try to overcome the pressure of the spring and the distance between the plates as fast as possible. It is important that before the pressure plates and clutch plates have made full contact, the pressure is reduced such that full engagement of the plates is not yet accomplished. This interval is known in the art as the pre-fill period of the clutch.

When the pressure plates and clutch plates start making contact and the pressure is decreased after the pre-fill period, the pressure of the actuator should rise again slowly to gradually increase engagement and to allow the pressure plates and the clutch plates to engage. As a result, the corresponding torque on the load increases as well. Instead of constantly increasing the pressure of the actuator until full engagement of the clutch as in the prior art, the pressure is increased gradually but, at least once or at certain intervals, it is decreased during a short time interval to create pressure dips. During these pressure dips, the pressure plates are released from the clutch plates for a short period such that the built-up torque on the load is decreased. By creating pressure dips while engaging the pressure plates and the clutch plates, the overall maximum torque is reduced. In order to lower the torque such that it remains below the maximum allowable torque on the load, pressure dips should occur at regular intervals.

Since the actuator often accomplishes engagement of a clutch according to a predetermined pressure characteristic, which is loaded into software used to control the engagement of the clutch, the pressure dip or dips and the intervals in between can advantageously be incorporated into this pressure characteristic and loaded into the software of the system for operating the actuator.

However, it is also envisageable to provide a control system that monitors the actual torque on the load and decreases the pressure of the actuator for a short interval whenever the torque exceeds a predetermined value. Such system automatically creates pressure dips. Alternatively, the gradient of the torque can be used as a value for establishing unallowable torque conditions and preventing that the torque on the load increases above the acceptable value. In this manner, an optimal engagement of the clutch will be accomplished without unnecessary pressure dips, which would slow down the engagement time of the load to the power source.

Because the increase in torque only occurs during the period when the pressure plates and clutch plates are starting to engage, it is not necessary to provide these pressure dips throughout the entire engagement period. Once the clutch plates start rotating with the pressure plates and the initial inertia of the load is thus overcome, the torque on the load commonly decreases to a level below the structural limitations of the load.

Such clutches are used for engaging and driving a header of agricultural machinery such as combines or forage harvesters with the drive line of the machine. Between the clutch and the header, a safety clutch is foreseen, which is designed to slip when an unacceptable torque occurs in the header drive. Such a safety clutch will make sure that at any moment, not only during engagement, but also during normal working conditions, the torque on the header is within certain limits. A frequently occurring problem is that during initial clutch engagement, the torque caused by the header inertia raises above the maximum allowable value of the safety clutch, causing the safety clutch to slip. The elements of the safety clutch rotate over each other in a ratcheting motion, causing an enormous increase in noise.

Although this ratcheting is needed during normal operation to warn the operator that too high a torque is applied to the header, e.g. when a stone starts blocking the header auger, it is not desired to occur upon each engagement of the header. Since the noise generated by the slippage of the safety clutch starts as a loud bang, the operator will experience it as frightening and something to avoid. Additionally, the safety clutch is there to prevent damage to the header due to sporadic high torques, but it is not designed to ratchet every time the header is engaged. The overall life cycle of the safety clutch is significantly reduced if the safety clutch needs to slip upon every renewed engagement of the header.

For the above reasons, the pressure dips are applied to the pressure characteristic of the actuator which engages the clutch, in order to limit the maximum torque generated in the drive line when engaging the header drive. These pressure dips will keep the torque below the value which causes the safety clutch to disengage and thus prevents the ratcheting thereof. The life cycle of the safety clutch is thus increased, since it will only need to operate when an actual torque increase under steady harvesting conditions occurs.

The invention claimed is:

1. A method for coupling a load to a power source by means of a clutch, the clutch comprises at least one pressure plate connected to the power source, at least one clutch plate connected to the load and located near the at least one pressure plate to allow contact with the at least one pressure plate, an actuator connected with the at least one pressure plate and capable of forcing the at least one pressure plate against the at least one clutch plate, the method comprises the steps of:
   initially increasing the pressure of the actuator for a first time interval to bring the at least one pressure plate into contact with the at least one clutch plate;
   gradually increasing the pressure of the actuator during a second time interval to allow the at least one clutch plate to be engaged with the at least one pressure plate; and
   after said second time interval, leveling the pressure of the actuator to maintain the engagement of the at least one pressure plate with the at least one clutch plate to allow the load to be driven by the power source, wherein the gradually increasing step includes gradually increasing the pressure of the actuator while applying at least once a pressure decrease lasting a short time interval to create at least one pressure dip for decreasing at least temporarily the torque generated in driving the load, wherein the application of the pressure dip is repeated until the at least one clutch plate and the at least one pressure plate are engaged sufficiently such that the generated torque is no longer above a predetermined value.

2. The method of claim 1, wherein the time required for the initial increase of the pressure of the actuator is reduced by applying a maximum pressure to the actuator until the at least one pressure plate is almost touching the clutch plate.

3. The method of claim 2, wherein the increase in pressure to the maximum is reduced to a lower value before allowing gradual increase of the pressure of the actuator to engage the at least one pressure plate with the at least one clutch plate.

4. An agricultural machine with a control configured to perform the method of claim 1, the clutch for engaging a load to a power source wherein the agricultural machine has a control operable to engage the clutch.

5. The agricultural machine as claimed in claim 4, wherein the machine is a combine harvester, the load is a header of the combine, the power source is a drive line of the combine harvester, and the clutch is configured to reduce the maximum torque on the header when engaging.

6. The agricultural machine as claimed in claim 4, wherein the machine is a forage harvester, the load is a header of the forage harvester, the power source is a drive line of the forage harvester, and the clutch is configured to reduce the maximum torque on the header when engaging.

7. A method for coupling a load to a power source by means of a clutch, the clutch comprises at least one pressure plate connected to the power source, at least one clutch plate connected to the load and located near the at least one pressure plate to allow contact with the at least one pressure plate, an actuator connected with the at least one pressure plate and capable of forcing the at least one pressure plate against the at least one clutch plate, the method comprises the steps of:
 initially increasing the pressure of the actuator for a first time interval to bring the at least one pressure plate into contact with the at least one clutch plate;
 gradually increasing the pressure of the actuator during a second time interval to allow the at least one clutch plate to be engaged with the at least one pressure plate; and
 after said second time interval, leveling the pressure of the actuator to maintain the engagement of the at least one pressure plate with the at least one clutch plate to allow the load to be driven by the power source, wherein the gradually increasing step includes gradually increasing the pressure of the actuator while applying at least once a pressure decrease lasting a short time interval to create at least one pressure dip for decreasing at least temporarily the torque generated in driving the load, wherein the at least one pressure dip is generated by a control system, the control system detecting the actual torque applied on the load and decreasing the pressure of the actuator for a short interval when the actual torque exceeds a predetermined value.

8. A method for coupling a load to a power source by means of a clutch, the clutch comprises at least one pressure plate connected to the power source, at least one clutch plate connected to the load and located near the at least one pressure plate to allow contact with the at least one pressure plate, an actuator connected with the at least one pressure plate and capable of forcing the at least one pressure plate against the at least one clutch plate, the method comprises the steps of:
 initially increasing the pressure of the actuator for a first time interval to bring the at least one pressure plate into contact with the at least one clutch plate;
 gradually increasing the pressure of the actuator during a second time interval to allow the at least one clutch plate to be engaged with the at least one pressure plate; and
 after said second time interval, leveling the pressure of the actuator to maintain the engagement of the at least one pressure plate with the at least one clutch plate to allow the load to be driven by the power source, wherein the gradually increasing step includes gradually increasing the pressure of the actuator while applying at least once a pressure decrease lasting a short time interval to create at least one pressure dip for decreasing at least temporarily the torque generated in driving the load, wherein the at least one pressure dip is generated by a control system, the control system detecting the gradient of the torque applied on the load and decreasing the pressure of the actuator for a short interval when the gradient of the torque exceeds a predetermined value.

\* \* \* \* \*